United States Patent
Fulknier et al.

(10) Patent No.: US 10,075,376 B2
(45) Date of Patent: Sep. 11, 2018

(54) MOBILE NETWORK OPERATING METHOD

(71) Applicant: WAAV INC., Cambridge, MA (US)

(72) Inventors: John C Fulknier, Charlestown, MA (US); Brian J Smith, Somerville, MA (US)

(73) Assignee: WAAV INC., Boston, MA (US)

( * ) Notice: Subject to any disclaimer, the term of this patent is extended or adjusted under 35 U.S.C. 154(b) by 0 days.

(21) Appl. No.: 13/846,575

(22) Filed: Mar. 18, 2013

(65) Prior Publication Data

US 2014/0269327 A1 Sep. 18, 2014

Related U.S. Application Data

(63) Continuation of application No. 12/148,377, filed on Apr. 18, 2008, now Pat. No. 8,422,491.
(Continued)

(51) Int. Cl.
*H04L 12/24* (2006.01)
*H04L 12/801* (2013.01)
(Continued)

(52) U.S. Cl.
CPC ............ *H04L 47/125* (2013.01); *H04L 41/00* (2013.01); *H04W 28/0205* (2013.01); *H04W 40/18* (2013.01)

(58) Field of Classification Search
CPC .............. H04W 28/0205; H04W 40/18; H04L 47/125; H04L 41/00
See application file for complete search history.

(56) References Cited

U.S. PATENT DOCUMENTS 5,812,531 A  9/1998  Cheung et al.
6,006,089 A  12/1999  Rathnasabapathy et al.
(Continued)

FOREIGN PATENT DOCUMENTS

WO  WO2004070970 A1  8/2004
WO  WO2007136618 A2  11/2007
(Continued)

OTHER PUBLICATIONS

A. Smiljanic. Rate and delay guarantees provided by clos packet switches with load balancing. IEEE/ACM Trans. Netw., 16:170-181, Feb. 2008.
(Continued)

*Primary Examiner* — Jianye Wu
(74) *Attorney, Agent, or Firm* — Invention Management Assoc. Inc.; Edward L. Kelley

(57) ABSTRACT

A network routing method includes operating a plurality of mobile computing devices in a cellular network environment with each mobile computing device including one or more cellular network interface devices each operable as a client of a cellular network that provides access to a WAN. Non-locally reachable network traffic originating on each mobile computer device is routed the one or more cellular network interfaces to a network controller reachable over the WAN. The network controller receives the non-locally reachable traffic and routes the non-locally reachable traffic to its original destination IP address. The network controller further operates to cause reply traffic responsive to the non-locally reachable traffic to be routed back to the network controller. The network controller further operates to route the reply traffic back to the originating mobile computer device over any of the one more cellular network interfaces.

37 Claims, 5 Drawing Sheets

Related U.S. Application Data

(60) Provisional application No. 60/925,041, filed on Apr. 18, 2007.

(51) Int. Cl.
*H04W 40/18* (2009.01)
*H04W 28/02* (2009.01)
*H04L 12/803* (2013.01)

(56) References Cited

U.S. PATENT DOCUMENTS

| | | |
|---|---|---|
| 6,483,852 B1 | 11/2002 | Jacquet et al. |
| 6,490,256 B1 | 12/2002 | Jones et al. |
| 6,546,425 B1 | 4/2003 | Hanson et al. |
| 6,574,481 B1 | 6/2003 | Rathnasabapathy et al. |
| 6,600,743 B1 | 7/2003 | Lee et al. |
| 6,778,495 B1 | 8/2004 | Blair |
| 7,010,303 B2 | 3/2006 | Lewis et al. |
| 7,012,895 B1 * | 3/2006 | Mir .................. H04L 45/06 370/235 |
| 7,016,682 B2 | 3/2006 | Won et al. |
| 7,079,853 B2 | 7/2006 | Rathnasabapathy et al. |
| 7,317,896 B1 | 1/2008 | Saxena et al. |
| 7,349,413 B2 | 3/2008 | Hong et al. |
| 7,376,137 B2 | 5/2008 | Sung et al. |
| 7,417,996 B2 | 8/2008 | Hong et al. |
| 7,417,998 B2 | 8/2008 | Lee |
| 7,551,590 B2 | 6/2009 | Haller et al. |
| 7,551,615 B2 | 6/2009 | Trumper et al. |
| 7,653,391 B2 | 1/2010 | Kobayashi et al. |
| 7,995,516 B2 | 8/2011 | Zhou et al. |
| 8,072,994 B2 | 12/2011 | Moeller |
| 8,125,989 B2 | 2/2012 | Kissel |
| 8,132,249 B2 | 3/2012 | Bichot et al. |
| 8,189,552 B2 | 5/2012 | Moeller |
| 8,422,491 B2 * | 4/2013 | Fulknier ............... H04L 45/24 370/352 |
| 8,533,330 B2 | 9/2013 | Tanimito |
| 8,817,599 B2 | 8/2014 | Moeller |
| 2002/0010866 A1 | 1/2002 | McCullough |
| 2003/0016636 A1 | 1/2003 | Tari et al. |
| 2004/0125795 A1 * | 7/2004 | Corson ............... H04L 29/06 370/356 |
| 2007/0110017 A1 * | 5/2007 | Fulknier ............... H04L 45/00 370/338 |
| 2008/0186897 A1 | 8/2008 | Rune et al. |

FOREIGN PATENT DOCUMENTS

| | | |
|---|---|---|
| WO | WO2007136620 A2 | 11/2007 |
| WO | WO2007136621 A2 | 11/2007 |

OTHER PUBLICATIONS

Reducing Congestion Effects in Wireless Networks by Multipath Routing—L. Popa, C. Raiciu, I. Stoica, D. S. Rosenblum, in proceedings of IEEE ICNP, Nov. 2006, Santa Barbara, USA.

Multi-Path TCP: A Joint Congestion Control and Routing Scheme to Exploit Path Diversity in the Internet Huaizhong et al. IEEE/ACM Transactions on Networking, vol. 14, No. 6, Dec. 2006.

* cited by examiner

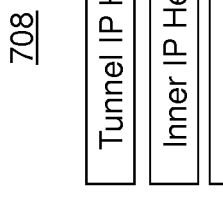
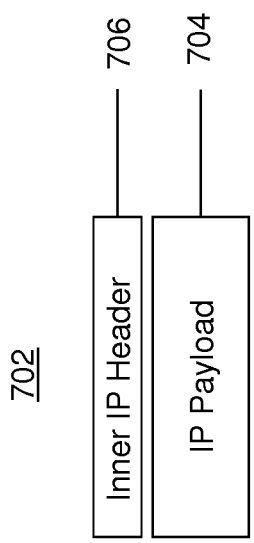
FIGURE 3
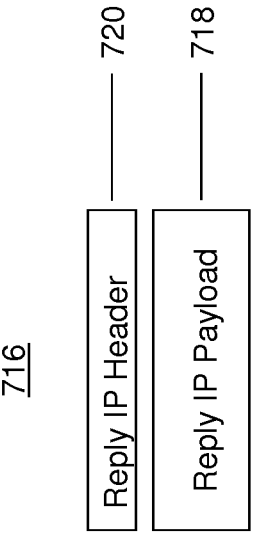
FIGURE 4
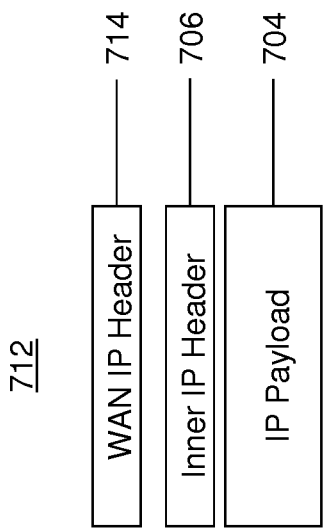
FIGURE 5
FIGURE 6

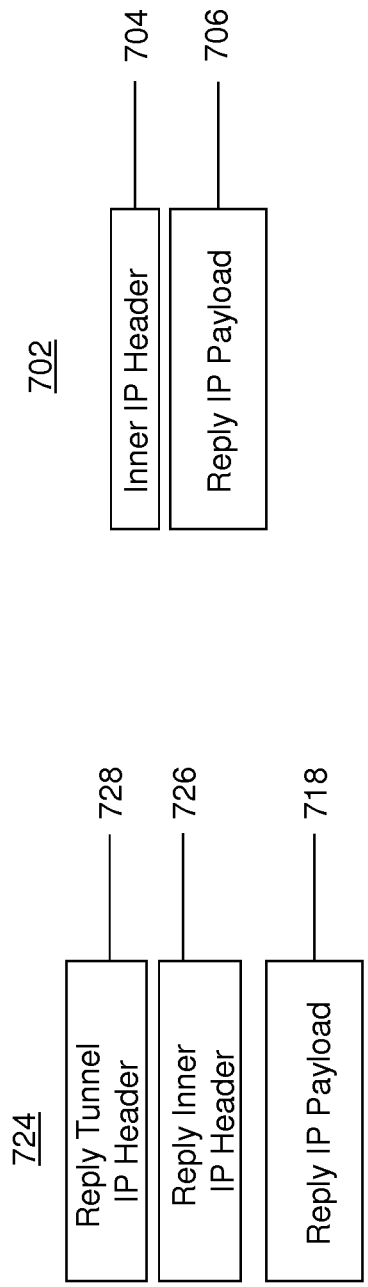

MOBILE NETWORK OPERATING METHOD

CROSS REFERENCE TO PRIOR APPLICATIONS

This application is a continuation of Non-Provisional application Ser. No. 12/148,377 entitled MOBILE NETWORK CONFIGURATION AND METHOD by Fulknier et al. filed on Apr. 18, 2008 and which claims priority to Provisional Application Ser. No. 60/925,041, entitled NETWORK CONFIGURATION FOR MANAGING NETWORK TRAFFIC TO A MOBILE ROUTER, by Fulknier et al., filed on Apr. 18, 2007, each of which is incorporated herein by reference in its entirety.

BACKGROUND OF THE INVENTION

1. Field of the Invention

The present invention relates to a mobile network configuration and method for operating a mobile network configuration. In particular, the mobile network includes a network controller operating as a nod on a WAN and a plurality of mobile subnets with at least two communication links established between each mobile subnet and the network controller.

2. Description of the Related Art

Mobile subnets configured to establish two or more communication links with a cellular network to access a WAN are known. One such mobile subnet is disclosed in copending and commonly assigned patent application Ser. No. 11/650,634 by Fulknier et al. filed on Jan. 6, 2007, entitled MOBILE ROUTER DEVICE. As described therein, two or more mobile router devices each having a single cellular network interface device installed thereon are interconnected or stacked together and controlled by a master router. The master router directs each cellular network interface device to establish a communication channel or link with a cellular network and directs outgoing network traffic to the cellular network over any one of the communication channels. Moreover any outgoing network traffic is routed directly to its destination IP address e.g. on a WAN.

One advantage of the router stack disclosed in the '634 reference is that the master router operates to distribute network traffic exiting from the router stack over all of the available communication channels and the network traffic can be equally load balanced over the available communication channels or otherwise routed to any one of the available communication channels according to network conditions, channel conditions, and other factors.

The router stack disclosed in the '634 reference operates such that any reply traffic responsive to the network traffic exiting from the router stack is returned to the router stack over the same communication channel that it exited the router stack over. One problem with the '634 reference network configuration occurs when one or more of the communication channels is no longer available or when an IP address assigned to one or more of the communication channels is changed. As a result, reply traffic can be lost when one of the communication channels is no longer available or its IP address is changed. Another problem with the '634 reference network configuration occurs when reply traffic bandwidth is wider than channel bandwidth capacity and this can degrade the overall performance of the mobile subnet. Accordingly there is a need in the art to control the distribution of reply traffic to a mobile subnet by directing reply data traffic over any the available communication channels as demanded by instantaneous network conditions.

SUMMARY OF THE INVENTION

The present invention overcomes the problems cited in the prior art by providing a mobile network configuration 500, 800 that includes a network controller 520 operating as a node on a public WAN 515 or a private WAN 640 or is reachable over a cellular network 505, 510 805 and a WAN gateway 568, 570, 815. Each of the mobile computing devices includes one or more cellular network interface devices 552, 554, 556, 558 operating thereon to automatically become a client of a suitable cellular network 505, 510, 805, whenever a suitable cellular network access point is available. In particular a suitable cellular network is compatible with one of the cellular network interface devices and provides a gateway 810 to the WAN 515.

Each mobile computing device operates to read network data packets, to determine a final destination IP address listed in each network data packet and if the final destination IP address is a non-locally reachable IP address the mobile computing device operates to reconfigure the network data packet to provide an exit data packet suitable for routing the exit data packet to the network controller 520 over a network route that passes over one of the cellular network interface devices operating on the mobile computing device, passes over the cellular network 505, 510, 805, passes over the gateway 568, 570, 815 to the WAN 515 to reach the network controller 520. Each exit data packet is reconfigured to include a second destination IP address in an outer IP heading that is usable to reach the network controller, a source ID associated the cellular network interface device that the exit data packet is being routed to the network controller over and the final destination IP address in an inner IP header that can be read by the network controller.

The network controller receives exit data packets from the plurality of mobile computing devices, reads the final destination IP address and the source ID from each exit data packet and stores the final destination IP address, the source ID and other information about the exit data packet on the network controller from retrieval as needed. If the final destination IP address is non-locally reachable from the network controller the exit data packet is modified for routing the modified exit data packet to the final destination IP address. Moreover the modified exit data packet includes as its reply IP address an IP address associated with the network controller such that any reply data packets responsive to the modified exit data packet are routed back to the network controller.

The network controller receives reply data packets responsive to modified exit data packets and for each reply data packet determines which modified data packet the reply data packet is responsive to, which exit data packet the modified exit data packet corresponds with and the source ID of the corresponding exit data packet using the information about the exit data packet that was stored on the network controller when the exit data packet was received. The network controller then modifies each reply data packet in a manner that routes a modified reply data packet back to the mobile computing device that the exit data packet was received from.

In cases where the mobile computing device includes a plurality of cellular network interface devices usable to route network traffic over the mobile computing devices operate to select which cellular network interface device to route each exit data packet to the network controller over e.g. to divide network traffic exiting the mobile computing device over two or more cellular network interface devices and to include the source ID of selected cellular network interface device in each exit data packet. Moreover the network controller reads the source ID of each exit data packet it receives and maintains a list the source ID's associated with each cellular network interface device presently and previously used to route exit data packets to the network controller from any one of the plurality of mobile computing devices.

Each mobile computing device may generate a network update listing the source ID of cellular network interface devices presently operating on the mobile computing device and presently established as a client on a cellular network and upload the network update to the network controller. In response the network controller updates the list of source ID's associated with the mobile computing device while still tracking source ID's that are no longer available in case the network controller receives a data packet that relates to a source ID that is no longer available it can routed the packet to the correct mobile computing device over a different cellular network interface device.

Each of the mobile computing devices and the network controller operate to measure and analyze route specific network operating information such as bandwidth, latency, congestion for upload and download routes and to store the historical operating characteristics of each route. The route specific network operating information is then exchanged between the network controller and each of the mobile computing devices and between each of the mobile computing devices and the network controller to characterize routes based on upload and download performance. The mobile computing device are then operated to optimize network performance for data uploads to the network controller by selecting network routes having favorable performance characteristics for data uploads and the network controller is operated to optimize network performance for data downloads to the mobile computing devices by selecting network routes having favorable performance characteristics for data downloads.

In further operating modes the mobile computing devices operate to invoke a routing scheme selects which cellular network interface device to route each exit data packet over based on various criteria including to divide network traffic over the available cellular network interface devices to select the lowest cost route, to optimizing network performance, e.g. by avoiding congested routes, or to select network routes based on exit data packet type, routing voice, text and video data over different cellular network interface devices. In addition the network controller may invoke a routing scheme to operate on the network controller to select one of a plurality of cellular network interface devices operating on the same mobile computing device to route data packets over. In doing so the network controller reads data elements from exit data packets and from network updates and stores information on the network controller to maintain awareness of the network. The information may include an exit packet ID tag read from each exit data packet, a device ID associated with the specific mobile computing device that the exit data packet was received from, a device ID of each cellular network interface device operating on the mobile computing device that the exit data packet was received from, and network performance characteristics of the network routes associated with each of the cellular network interface device ID's.

BRIEF DESCRIPTION OF THE DRAWINGS

The features of the present invention will best be understood from a detailed description of the invention and a preferred embodiment thereof selected for the purposes of illustration and shown in the accompanying drawings in which:

FIG. 3 illustrates an example subnet data packet.

FIG. 4 illustrates an example subnet exit data packet according to the present invention.

FIG. 5 illustrates an example WAN data packet according to the present invention.

FIG. 6 illustrates an example reply data packet.

FIG. 7 illustrates an example reply tunnel data packet according to the present invention.

FIG. 8 illustrates an example subnet reply data packet.

DESCRIPTION OF THE PREFERRED EMBODIMENTS

Figure 1:
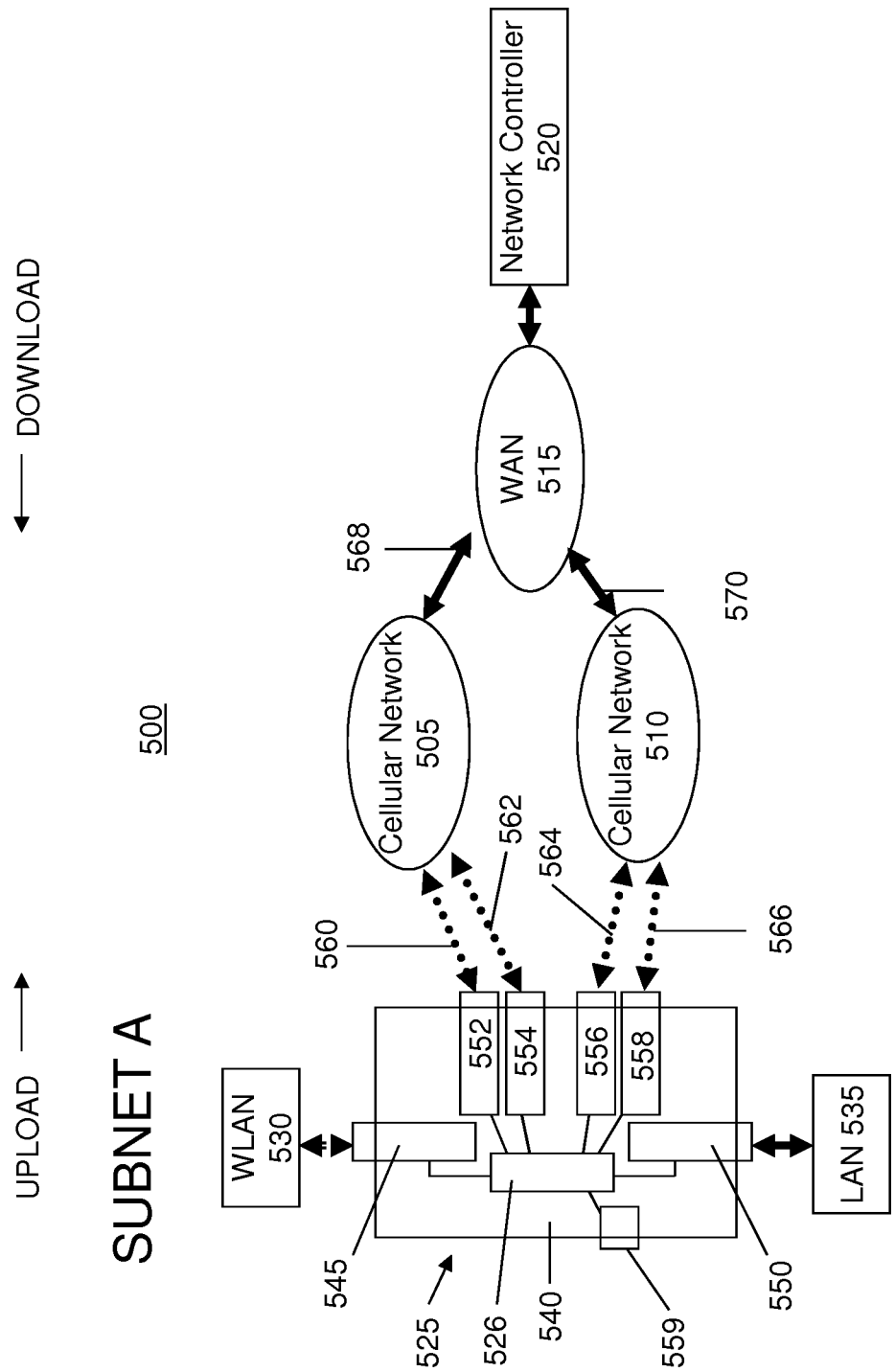
FIG. 1 illustrates a first mobile network configuration according to the present invention.

Referring now to FIG. 1, a first mobile network configuration 500 includes a network subnet A, one or more cellular networks 505 and 510, a Wide Area Network WAN 515, such as the Internet or world wide web, a private network or other wide area network configurations, and a network controller 520, such as a server installed as a node on the WAN 515. The subnet A comprises a mobile router 525 for establishing at least one local subnet such as a WLAN 530, a LAN 535, or both, and for establishing a network interface between local subnets 530, 535 and at least one cellular network 505, 510. The mobile router 525 includes a subnet controller 540. The subnet controller 540 at least includes a microprocessor and associated memory module 526 and a plurality of network interface devices, 552, 554, 556, 558, 545, 550, 559 interconnected with the microprocessor and associated memory module 526 and configured to exchange network data packets with the microprocessor and associated memory module 526. Additionally, the subnet controller 540 includes program steps stored and operating on the microprocessor and associated memory module 526 for reconfiguring or translating network data packet headers, and the like, for routing network traffic over network routing paths and for populating, storing and periodically updating one or more data tables and or other databases with network and network data packet related data.

In the example embodiment of FIG. 1, a WLAN configured network interface device 545 is provided to establish the WLAN 530, a LAN configured network interface device 550 is provided to establish the LAN 535 and one or more cellular configured network interface devices 552, 554, 556, 558 are provided to communicate with the first cellular network 505 and or the second cellular network 510. In addition, a satellite telecommunications network (STN) interface device 559, or the like, may also be installed on the subnet controller 540 or otherwise interfaced with the subnet controller 540 to communicate with the microprocessor and associated memory module 526 and with a STN. While the STN interface device 559 may interface with any of various STN public and private satellite networks, a particularly useful STN interface device 559 includes a Global Positioning System receiver for receiving signals from a Global Navigation Satellite System for regularly determining an instantaneous global position, velocity, heading and local time and communicating that information to the microprocessor and associated memory module 526.

In addition to the subnet A, described above and shown in FIG. 1, other example subnets usable with the present invention are described in commonly assigned U.S. patent application Ser. No. 11/497,892 by Fulknier et al. filed on Aug. 2, 2006, entitled MOBILE ROUTER DEVICE and in commonly assigned U.S. patent application Ser. No. 11/650,634 by Fulknier et al. filed on Jan. 6, 2007, entitled MOBILE ROUTER DEVICE, both of which are incorporated herein by reference in their entirety.

In operation, the mobile router 525 communicates with locally reachable devices on the WLAN 530 and or LAN 535 and assigns each locally reachable device with a local or subnet IP address that identifies the device subnet network and subnet node. Additionally, the mobile router 525 communicates with the first cellular network 505 over the first cellular network interface device 552 to establish a first subnet to cellular network communication channel 560. Once established, the first cellular network 505 assigns the first cellular network interface device 552 with a first IP address. The first IP address may comprise a public IP address, a private IP address, a subnet IP address or any other public or private network address usable to uniquely identify the first cellular network device 552 as a node on the cellular network 505.

If the mobile router 525 includes a second cellular network interface device 554, a second subnet to cellular network communication channel 562 is established with the first cellular network 505 and the first cellular network 505 assigns the second cellular network interface device 554 with a second IP address. Similarly, the mobile router 525 may include a third cellular network interface device 556 and a fourth cellular network interface device 558 each configured to communicate with the second cellular network 510 over third and fourth subnet to cellular network communication channels 564 and 566. Once established, the second cellular network 510 assigns the third and fourth cellular network interface devices 556, 558 with corresponding third and a fourth IP addresses.

Alternately, the mobile router 525 may be configured with all of its cellular network interface devices 552, 554, 556 and 558 communicating with a single cellular network, (e.g. 505), or with each of its cellular network interface devices 552, 554, 556 and 558 communicating with a different cellular network such as when there are four different cellular networks available in the local region. More generally, the mobile router 525 may include one or more cellular network interface devices communicating with one or more cellular networks to provide at least two different cellular network communication channels. In one particularly useful embodiment, of the present invention, the subnet A includes two cellular network interface devices 552 and 554 communicating with a single cellular network 505 over two independent communication channels 560, 562.

The first and second cellular networks 505 and 510 may comprise similar cellular networks such as two commercial cellular telephone networks each using radio frequencies approximately center around commercial cellular telephone network radio, microwave or other frequency bands such as around 700, 800 or 900 MHz, around 1.8, 1.9 or 2.1 GHz, or around any other communication frequency bands assigned to cellular networks. Moreover the cellular networks 505 and 510 are preferably configured for wireless digital transfer using a suitable digital data transfer protocol such as High Speed Downlink Packet Access (HSDPA) and High-Speed Uplink Packet Access (HSUPA), Code Division Multiple Access (CDMA), Evolution-Data Optimized (EVDO), Enhanced Data Rates for GSM Evolution (EDGE), General Packet Radio Service (GPRS) Third Generation Partnership Program Long Term Evolution (3GPP LTE) or any other digital data transfer protocol for wireless data transfer over radio, microwave or frequency bands used in wireless networks.

Alternately, the first and second cellular networks 505 and 510 may comprise two different cellular networks, such as when the first cellular network 505 comprises a commercial cellular telephone network using frequency bands reserved for commercial networks and the second cellular network 510 comprises a private, municipal, law enforcement, public safety, military or other non-public network such as a public safety network using frequencies approximately centered around 4.9 GHz. Alternately, one cellular network may comprise a World Wide Operability for Microwave Access (WiMax) network or a Metropolitan Area Network (MAN), using frequencies approximately centered around 2.1, 2.5, 3.5 or 5.8 GHz. More generally, the first and second cellular networks 505, 510 may comprise any two cellular networks having different characteristics, such different wireless communication frequency bands, different data transfer protocols, different access requirements, that may require two different cellular network interface devices 552 and 556 installed on the mobile router 525.

Generally, the mobile router 525 is configured to operate with a desired set of cellular networks 505 and 510 by installing one or more cellular network interface devices (552, 554, 556, 558) configured to communicate with each of the desired cellular networks thereon. In some applications it may be desirable for all of the cellular network interface devices (552, 554, 556, 558) to communicate with the same cellular network, e.g. the first cellular network 505. In other applications, it may be desirable for all but one of the cellular network interface devices 552, 554, 556 to communicate with the first cellular network 505 and for one cellular network interface devices 558 to communicate with the second cellular network 510. Accordingly, the configuration of the mobile router 525 is application dependent. Moreover, the mobile router 525 can be constructed with the subnet controller 540 having ports configured to receive interchangeable network interface devices therein. In one example, the mobile router 525 may include a plurality of card slot interfaces, not shown, configured to receive interchangeable PC cards therein. In addition, each cellular network interface device 552, 554, 556, 558 may be configured as an interchangeable PC card such that a user or manufacturer may reconfigure the mobile router 525 by installing a desired set of cellular network interface devices configured as PC cards into card slot interfaces on the mobile router 525 to configure the mobile router 525 to communicate with different cellular networks as may be required.

In the example embodiment shown in FIG. 1, the cellular network interface devices 552, 554 are configured to establish communication sessions 560, 562 with a local access point of the first cellular network 505, (e.g. a cellular network tower), and the cellular network interface devices 556, 558 are configured to establish communication channels 564, 566 with a local access point of the second cellular network 510. In this example, when the subnet A has communication access to both the first and the second cellular networks, all four communication channels can be established and the subnet is fully interfaced. Otherwise the subnet A may be less than fully interfaced and the interface level may vary as the subnet moves over geographic regions.

As described above, the mobile router 525 establishes communication sessions between the subnet A and local access points of the cellular networks 505 and 510 and each communication channel 560, 562, 564, 566 and a different IP address assigned to its cellular network interface device 552, 554, 556, 558. As the mobile subnet A moves over a geographic region, communication channels may be handed off from one cellular network access point to another without terminating the communication channel and without changing the IP address associated with the cellular network device 552, 554, 556, 558 associated with the communication channel. However, if a communication channel is some how terminated or dropped, the IP address assigned to the dropped cellular network interface device may be lost. After a drop or termination, a new communication channel is established by the corresponding cellular network interface device when a suitable cellular network access point becomes available and the initiation of the new communication channel may include assigning the corresponding cellular network interface device with a new IP address. In cases where a cellular network provides roaming access to other cellular networks, communication channel hand-offs may be made to pass a communication channel from one cellular network to another without interrupting the communication channel or changing the IP address of the cellular network interface device associated with the communication channel.

Referring now to FIG. 1, the mobile router 525 has four distinct and separate communication channels usable as network routes to the network controller 520. First and second network routes include the cellular network interface devices 552, 554, the communication channels 560, 562, the first cellular network 505, the WAN gateway 568 and the WAN 515. Third and fourth network routes include the cellular network interface devices 556, 558, the communication channels 564, 566, the second cellular network 510, the WAN gateway 570 and the WAN 515.

According to a preferred embodiment of the present invention, at least two of the communication channels are always utilized to exchange network traffic between the mobile subnet A and the network controller 520. In the example of FIG. 1, the mobile router 525 operates to upload network traffic from the subnet A to the network controller 520 using each of the four network routes to the network controller 520 and to download network traffic from the network controller 520 to the subnet A also using each of the four network routes. More specifically, network traffic being upload form the subnet A to the network controller 520 has a source IP address corresponding with an IP address assigned to any one of cellular network interface device 552, 554, 556 and 558 and a destination IP address corresponding with a WAN IP address assigned to the network controller 520. Conversely, network traffic being downloaded from the network controller 520 to the subnet A, has a source address corresponding with the WAN IP address of the network controller 520 and as a destination IP address an IP address assigned to any one of cellular network interface device 552, 554, 556 and 558.

In operation, the subnet controller 540 uses Network Address Translation, (NAT) and or Network Address Port Translation, (NAPT) to receive network traffic from the subnets 530 and 535, and then route the subnet traffic to the network controller 520. The subnet controller 540 also receives reply network traffic responsive to subnet network traffic sent to the network controller 520 and routes the reply network traffic to appropriate subnet source IP addresses on the subnets. More specifically, when the microprocessor and associated memory module 526 receives a network data packet from a device connected with the WLAN 530 and or LAN 535, it reads the data packet header to determine the data packet subnet source IP address, its destination IP address, a reply port assignment, and any other routing or network related information that may be included in the data packet header. The subnet controller 540 then stores some or all of the local data packet header information in data fields such as a routing table or other database stored on the subnet controller 540. If the data packet destination IP address is a locally reachable subnet IP address, the subnet controller 540 may route the data packet to the locally reachable subnet IP address without changing the packet header. If the data packet destination IP address is not a locally reachable subnet IP address, the subnet controller 540 assigns a network route to the data packet. The assigned network route determines which cellular network interface device 552, 554, 556, 558 will be used to route the network packet out of the subnet A and which IP address associated with the selected cellular network interface device 552, 554, 556, 558 will be used at the source IP address of the data packet. According to an important aspect of the present invention, the subnet controller 540 directs substantially all network traffic exiting the subnet A to the network controller 520.

Figure 2:
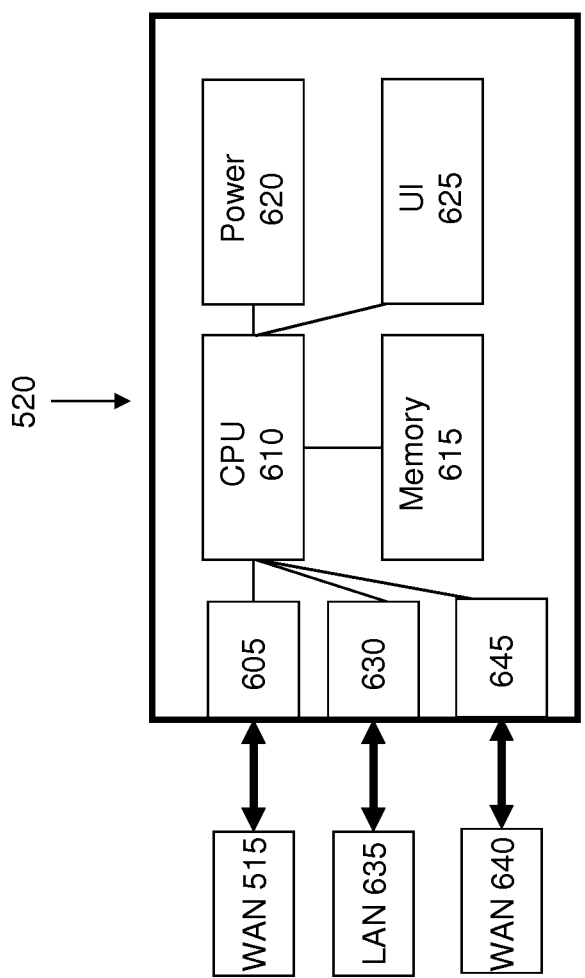
FIG. 2 illustrates a network controller according to the present invention.

Referring now to FIG. 2, in one example embodiment, the network controller 520 comprises an internet server installed as a node on the WAN 515. The network controller 520 includes one or more network interface devices 605 such as a wire Ethernet, cable modem or other broadband high speed network gateway interconnected with the WAN 515 with each network interface devices 605 having an IP address or other network node identifier. The network controller 520 further includes one or more digital microprocessors or central processing units, (CPU) 610 and memory modules 615 interconnected therewith. The network controller 520 also includes a power supply module 620, and may include a user interface module, (UI), 625, such as a keyboard, mouse and video monitor or other suitable user interface devices.

In another example embodiment the network controller 520 comprises an internet server installed as a node on the private WAN 640 by a network interface device 645 such as a wire Ethernet, cable modem or other broadband high speed network gateway. The private WAN 640 includes a network gateway connected to each of the cellular networks 505, 510 and other cellular networks as may be required to function like the WAN 515 shown in FIG. 1. When using the private WAN 640, the network interface device 645 has a private IP address not reachable except through the private WAN 640.

In both example embodiments, the network controller 520 may include additional network interface devices 630 for communicating with other networks such a LAN 635, a satellite network, telephone switching network, cellular network, WLAN, or any other network, not shown, as may be required, and the other network interface devices 630 each has a private or public IP address assigned thereto. In particular, the network controller 520 may be associated with a subnet LAN 635 or private WAN 640 comprising a plurality of network servers, data storage devices, and other devices as may be required to support the operation of the network controller 520 to interface with a plurality of mobile subnets, cellular networks e.g. 505 and 510 or WAN's 515 as may be required.

Generally, the network controller 520 includes program steps stored and operating on the one or more digital microprocessors 610 and memory modules 615 to receive network traffic in and route network traffic out using NAT and or NAPT to track and route individual data packets as required. For example, network data packets are received from the mobile router 520 over the WAN 515 or private WAN 640 and each data packet is read by the microprocessor 610 to determine an ultimate destination IP address, e.g. on the WAN 515, of the packet and the packet is reconfigured for routing to the ultimate destination IP address over a selected route. For each data packet, the digital microprocessors 610 and memory modules 615 also store network routing instructions and packet information in data fields such in routing tables and or databases, for tracking the data packet route, and for routing any reply data packets responsive to the data packet back to its origin such as a device on one of the mobile subnets 530, 535.

Referring to FIGS. 1 and 2, according to a further aspect of the present invention, the subnet controller 540 and network controller 520 cooperate to establish one or more IP tunnels between the subnet A and the network controller 520. Each IP tunnel extends from one of the cellular network interface devices 552, 554, 556 or 558 to the network controller 520 and passes over at least one cellular network, e.g. 505 or 510 and over the WAN 515 or a suitable private WAN 640 interconnected between the cellular networks 505 and 510 and the network controller 520. IP tunnels between the subnet A and the network controller 520 are established by reconfiguring or translating network data packets to insert temporary routing information into the data packet headers. According to the present invention, substantially all of the network traffic exiting from the subnet A is routed to the network controller 520 before being routed to its final destination IP address on the WAN 515 or any other network device reachable by the network controller 520. Moreover, both the network controller 520 and the subnet controller 540 use Network Address Translation, (NAT) and or Network Address Port Translation, (NAPT) to upload data traffic from the subnet A and the network controller 520, to route data traffic from the network controller 520 to destination IP address on the WAN 515 or other networks to receive reply data traffic between the IP destination addresses and the network controller 520 and to download the reply data traffic from the network controller 520 to the subnet A.

Referring now to FIGS. 1 and 3, a subnet data packet 702 originating at a source device locally connected to the subnet A includes an IP payload 704, and an inner IP header 706. The packet may also include a footer, not shown. The inner IP header 706 at least includes a source IP address, a destination IP address and control information. The source IP address is the local or subnet IP address assigned to the source device. The source device may be any client device of the WLAN 530, the LAN 535 or any other network device communicating with to the subnet A other than over one of the cellular network interface devices 552, 554, 556, 558. The destination IP address may comprise any destination IP address such as a locally reachable subnet IP address or a non-locally reachable IP address such as on the WAN 515, WAN 640. Generally, the source and destination IP addresses are 32-bit addresses. The control information may include packet IP version, header length, packet length, type or quality of service, packet ID tag, fragmentation and offset data, protocol, a check sum for error detection, time to live, (TTL), a reply port assignment or any other data usable to identify and route the IP payload 704 to its destination IP address and to route reply data packets responsive to the IP payload 704 from the destination IP address back to the subnet source IP address as required. Moreover, as will be described below, according to the present invention, the mobile router 525 and the network controller 520 cooperate to route the IP payloads 704 originating in the subnet A to appropriate destination IP addresses and to route reply packets responsive to the IP payloads 704 from the destination IP address back to appropriate source IP addresses reachable by the subnet A as the subnet moves over a geographic region covered by cellular networks.

Upon receiving the subnet data packet 702, the subnet controller 540 reads the inner IP header 706 and stores the packet source IP address, destination IP address and selected control information in data fields, such as in a data table or database, e.g. a routing table maintained by the microprocessor and associated memory module 526. More specifically, the data table or database is configured to relate each subnet data packet 702 with the subnet route or network interface device and the source device that the packet was received from. Thereafter, the subnet controller 540 determines if the subnet packet destination IP address is locally reachable and if so, routes the subnet data packet 702 to the locally reachable device. If the locally reachable device generates a reply packet responsive to the subnet data packet 702, the reply packet is communicated to the subnet controller 540. The subnet controller 540 reads the reply packet inner header and associates the reply packet with the appropriate subnet data packet 702 that generated the reply packet by matching source and destination addresses, packet tag ID or other control data as may be required. Thereafter, the reply packet is routed to the source IP address the subnet data packet 702 over the subnet reply port specified in the subnet data packet inner header 706.

If the destination IP address of the subnet data packet 702 is not locally reachable, the subnet controller 540 selects a network route associated with one of the cellular network interface devices 552, 554, 556 and 558 and reconfigures or translates the subnet data packet 702 for routing to the network controller 520. In this case, the subnet data packet 702 is reconfigured to form a subnet exit data packet 708.

Referring to FIG. 4, each subnet data packet 702 having a destination IP address that is not reachable over the subnet A is reconfigured as subnet exit data packet 708 by adding a tunnel header 710 preceding the inner IP header 706 and the subnet data packet IP payload 704. The subnet controller 540 first reads the inner header 706, stores the source and destination IP addresses read there from in data fields stored on the subnet controller 540 and selects which one of the cellular network interface devices 552, 554, 556 and 558 will be used to route the subnet data packet 702 over based on control information read from the data packet inner IP header 706 and on route selection criteria stored on the mobile router 525.

Once a routing path is selected, the tunnel IP header 710 is constructed with a tunnel source IP address corresponding with a current IP address assigned to the cellular network interface device 552, 554, 556 and 558 associated with the selected routing path. The tunnel IP header 710 also includes a tunnel destination IP address, which according to the present invention is the IP address of the network controller 520. The tunnel IP header 710 may also include control information which is different from the control information stored in the inner IP header 706. In particular, the subnet controller 540 is configured to construct tunnel IP headers 710 as may be required to efficiently tunnel data packets to the network controller 520 and to receive reply data packets back there from. For example, the subnet controller 540 may construct IP headers using different versions, protocols, type or quality of service, reply ports, etc. as may be required to utilized a desired route between the subnet A and the subnet controller 520 or to otherwise optimize network performance. Moreover, the subnet controller 540 is also configured to construct tunnel IP headers 710 with control data that is usable to evaluate the performance of network routes between the subnet A and the network controller 520. In particular, the tunnel IP headers may include a time stamp and other control data that may be useful for measuring network route characteristics such as bandwidth, congestion and latency. In addition, each tunnel IP header 710 may also include a subnet ID that uniquely associates the data packet the mobile router of the subnet A. Generally, the tunnel IP header 710 encapsulates the inner IP header 706 thereby causing the inner IP header 706 to be ignored by other networks, such as the cellular networks 505 and 510 and the WAN 515.

The network controller 520 receives subnet exit data packets 708 from the subnet A, reads each tunnel IP header 710 and stores the source IP address and control data read from the tunnel IP header 710 in data fields stored on the network controller 520. The network controller 520 then removes the tunnel IP header 710, reads the inner IP header 706 and stores the exit packet destination IP address in the data fields with the source IP address and control data read from the tunnel IP header 710. The network controller 520 is configured to store data fields read from exit data packets 708 in data tables or databases stored on the network controller 520 and to relate each exit data packet 708 to its source subnet A, using one or all of the subnet ID, the source IP address assigned to the cellular network interface device 552, 554, 556, 558 used to route the exit data packet 708 to the network controller 520, the subnet source IP address read from the inner IP header 706 or any other data that uniquely associates an exit data packet 708 with the subnet A or a source IP address of assigned to the cellular network interface device 552, 554, 556, 558.

Referring to FIG. 5, each exit data packet 708 is reconfigured as WAN data packet 712 by adding a WAN header 714 preceding the inner IP header 706 and the subnet data packet IP payload 704. The WAN data packet 712 includes the IP payload 704, the inner IP header 706 and a WAN header 714. The WAN header 714 encapsulates the inner header 706 thereby causing the inner IP header 706 to be ignored by other networks, such as the WAN 515. The WAN header 710 includes as its destination IP address, the destination IP address read from the inner IP header 706, and as its source IP address the IP address of the network controller 520. The WAN header 710 may also include control data such as packet size, packet ID, a time stamp, a reply port assignment and any other control data as may be selected by the network controller 520. Thereafter, the network controller 520 routes the WAN data packet 712 to its destination public IP address using routing data stored on the network controller 520. Once the WAN data packet 712 reaches its destination IP address, any reply data packets responsive to the WAN data packet 712 are returned to the network controller 520 over the a network controller reply port listed in the WAN header 710.

Referring now to FIG. 6, a reply data packet 716 comprises a data packet responsive to a WAN data packet 712. The reply data packet 716 includes a reply IP payload 718 and a reply IP header 720. The reply IP header 720 is generated by the network device associated with the destination IP address. The reply IP header 720 includes as its source IP address the destination IP address of the WAN data packet 712, as its destination IP address the IP address of the network controller 520, and as its reply port assignment the network controller reply port assignment read from the WAN IP header 714. The reply IP header 720 may also include other control data such as a packet size, a packet ID, a time stamp and any other data included therein by the network device associated with the destination IP address.

Upon receiving a reply data packet 716, the network controller 520 reads the reply IP header 720 and compares data in the reply IP header 720 with data stored in data tables on the network controller 520 to thereby match the reply data packet 716 with a corresponding WAN data packet 712. Once the corresponding WAN data packet 712 is identified, the network controller 520 uses data stored in data fields related to the WAN data packet 712 to match the reply data packet 716 with the corresponding tunnel data packet 706 and then with the corresponding subnet A that generated the subnet data packet 702. The corresponding subnet A that generated the subnet data packet 702 may be identified the, subnet data packet ID, the source IP address or the subnet ID read from the tunnel IP header 710 and stored by the network controller 520. Once the network controller 520 identifies the corresponding subnet A that generated the subnet data packet 702, the reply data packet 716 is prepared for routing there to.

The network controller 520 may be configured to select which cellular network interface device 552, 554, 556, 558 to route a particular reply tunnel packet 724 to the subnet A over according to various criteria including instantaneous network conditions, past performance of each network route, according to packet type or quality of service, by a preset routing sequence, e.g. to send an equal number of data packets over each available route or by various other criteria as may be suitable. Moreover, when an IP address of one of the cellular network interface device 552, 554, 556, 558 is changed, e.g. during a drop or a hand off, the network controller network 520 is configured to relate new IP addresses with prior IP addresses to ensure that reply data packets can be routed to the subnet A even after an IP address change.

Referring to FIGS. 6 and 7, once a routing path to the subnet A is selected, the reply IP header 720 is removed from the reply data packet 716 and a reply tunnel IP header 728 is constructed with a tunnel source IP address corresponding with the IP address assigned to the network controller 520. The reply tunnel IP header 728 also includes a reply tunnel destination IP address, which according to the present invention is any one of the IP addresses assigned to the cellular network interface devices 552, 554, 556 and 558 installed on the subnet A. The reply tunnel IP header 728 may also include control information which is different from the control information stored in the reply IP header 720. In particular, the network controller 520 is configured to construct reply tunnel IP headers 728 as may be required to efficiently tunnel data packets to the network controller 520 and to receive reply data packets back there from. For example, the network controller 520 may construct reply tunnel IP headers 728 using control data such as versions, protocols, type and quality of service, reply ports, etc. as may be required to utilized a desired route between the network controller 520 and the subnet A or to otherwise optimize network performance. Moreover, the network controller 520 is also configured to construct reply tunnel IP headers 728 as may be required to measure or otherwise evaluate the performance of network routes between the network controller 520 and the subnet A such as by including time stamps, and other data as may be useful in reply tunnel IP headers 728. Generally, the reply tunnel IP header 728 encapsulates the reply IP header 726 thereby causing the reply IP header 726 to be ignored by other networks, such as the cellular networks 505 and 510 and the WAN 515.

Upon receiving a reply tunnel packet 724, the subnet controller 540 reads that reply tunnel IP header 728 and stores any useful data contained therein in data tables stored in the subnet controller 540. Thereafter the reply tunnel IP header 728 is removed and the subnet controller 540 reads the reply inner header 726 which includes the subnet IP address of the original subnet data packet 702 and routes the reply IP payload to the appropriate subnet IP address.

Figure 9:
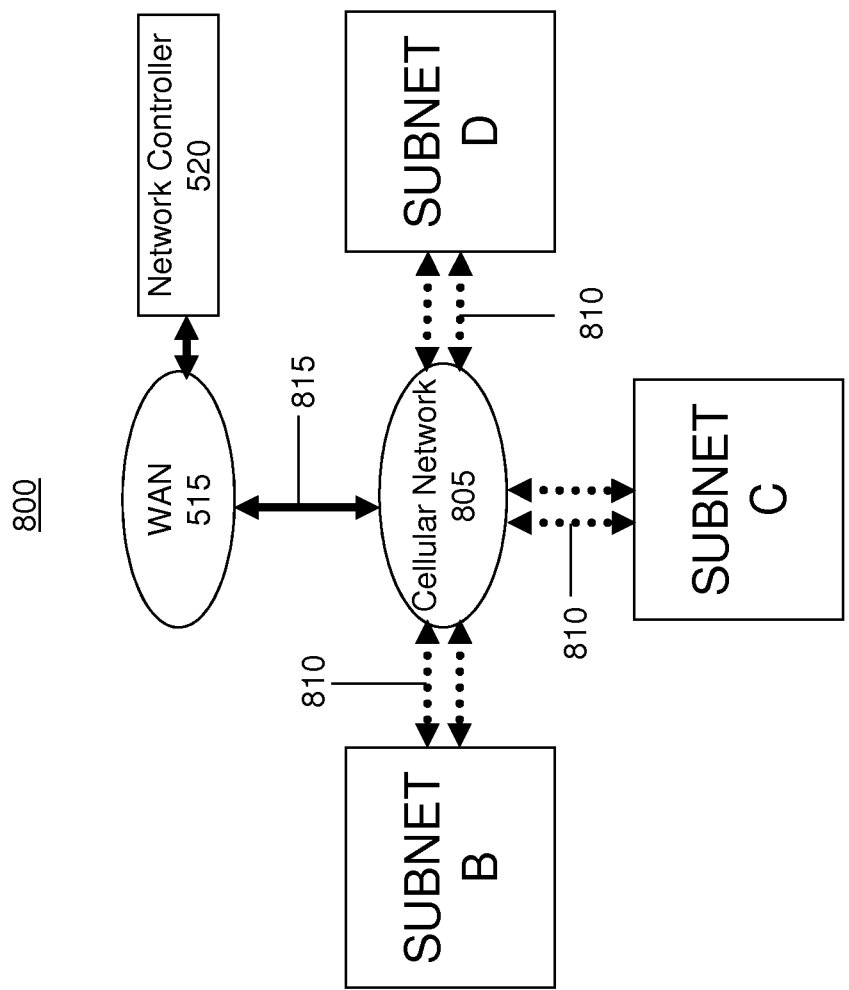
FIG. 9 illustrates a second mobile network configuration according to the present invention.

Referring now to FIG. 9, an expanded network configuration 800 comprises a plurality of mobile subnets B, C and D operating in one or more geographic regions with each mobile subnet B, C and D communicating with a cellular network 805 over at least one wireless communication channel 810. The cellular network 805 includes a gateway 815 to the WAN or Internet 515, or to a private WAN 640, which provides communication access to the network controller 520. In the expanded network configuration 800, the cellular network 805 may comprise a plurality of cellular networks each having a separate gateway 815 to the WAN or Internet 515 or a private WAN 640. In particular, the plurality of cellular networks 805 comprises any wireless network capable of communicating with an appropriately configured mobile subnet and with the WAN 515 or a private WAN 640. More specifically, the plurality of cellular networks 805 may comprise cellular networks disposed over many geographic regions, e.g. disposed globally, and may comprise various cellular network types using different communication frequencies and different communication protocols as well as different user access criteria. Additionally as described above, the cellular networks 805 may comprise public, private, corporate, public safety, government, military or any other type of cellular network and the mobile subnets B, C and D may simultaneously communicate with one or more cellular networks over one or more communication channels. Accordingly, in the expanded network configuration 800, a mobile subnet B, C and D may be capable of movement over a wide geographic region, e.g. substantially globally, while still maintaining an active communication channel with the cellular network 805 and while still exchanging all non-local subnet network traffic with the network controller 520.

Referring again to FIG. 1, according to a further aspect of the present invention, each of the network controller 520 and the subnet controller 540 are configured to exchange network information with each other. The network information exchanged may include configuration data, geographic position data, network performance data, historic data, security data, and any other data as may be required. As described above, each of the network controller 520 and the subnet controller 540 maintains local data tables and or other databases thereon. The data table or database generated by the subnet controller 540 or the network controller 520 may include a top level data field for storing a host device ID, a network route ID, a bus ID, a subnet ID or any other top level data in a top level data field. In addition, the data table or database includes lower level data fields each related to a top level data field for storing characteristics of the device or route identified in the top level data field. Moreover, data fields of the data tables and databases are updated whenever data changes occur or may be updated at regular time intervals ranging from once a second, or less, to monthly or annually, depending upon the nature of the data stored in a particular field.

Accordingly, the network controller 520 and subnet controller 540 each include program steps stored and operating thereon for operating a relational database, for populating data fields, for relating one data field to another and for periodically updating data fields. In addition, the network controller 520 and subnet controller 540 each include program steps stored and operating thereon for reading the data contained in the data fields and for analyzing the data using calculations, algorithms, logical operations, or the like, as may be required to route network data packets and to optimally select network routes as network conditions change. Moreover, the network controller 520 and subnet controller 540 each include program steps stored thereon and hardware as may be required to measure or otherwise quantitatively analyze network performance, e.g. by measuring network route characteristics such as latency, bandwidth and congestion, vs time of day and other factors, by measuring cellular network characteristics such as access point GPS coordinates, access point signal strength vs GPS coordinates, by tracking the GPS coordinates and time of day of drops, handoffs, roaming handoffs, and the like, and by tracking network configurations, peak network traffic and other characteristics of the network environment. In addition, the network controller 520 and the subnet controller 540 each include program steps stored thereon for communicating with each other and with other network controllers as may be required to exchange network operating information and network route information as may be required.

As an example of process steps performed by the subnet controller 540, upon power up, the subnet controller 540 determines which network interface devices are installed on the subnet controller 540, determines the MAC address or other device ID of each network interface device and assigns a separate bus to each network interface device. Thereafter the MAC address and a bus ID are stored in a top level data field of a data table or database. The subnet controller 540 then determines which client devices are locally reachable over each bus ID, assigns a subnet IP address to each locally reachable client device, enters the subnet IP addresses into lower level data fields of the data table or database and relates client device IP addresses or other device ID's to appropriate bus ID's, network interface device ID's, or other top level data fields.

In one example, a data table includes a top level data field containing a bus ID and a plurality of related data fields listing the subnet IP addresses of each device reachable over the bus ID. The data table also includes a plurality of data fields related to each subnet IP address for storing data packet source IP addresses, destination IP addresses, reply port assignments, and other control data associated with data packets originating from and routed to the subnet IP address. Accordingly, a data table may include top level data fields for storing network interface device ID's, bus ID's or the like, and lower level data fields related to each top level data field for storing a list of device ID's reachable over the network interface device and for storing data suitable for tracking communication sessions and data packets associated with each communication session. In addition, data tables or databases may include a plurality of global data fields that relate to all other data fields for storing global data such as a subnet ID, time stamps, GPS coordinates of the mobile subnet vs time stamp, and other global data as may be useful.

In further aspects of the present invention, the cellular network interface devices 552, 554, 556, 558 installed on subnets A or B-D are capable of determining characteristics of the cellular networks 505, 510, 805 such as cellular network type, access point signal strength, or the like and the subnet controller 540 is configured to collect characteristics of the cellular networks and store the characteristics of cellular networks in data tables or databases associated with global data fields such as GPS coordinates and time stamps to map cellular network characteristics. In particular, upon power up, each cellular network interface device 552, 554, 556, 558 determines if there are any properly configured cellular network access points locally available to connect with and if so, measures the signal strength of all of the locally available cellular network access points. In addition, if other information about the cellular network access points is available, such as access point ID, GPS coordinates, cellular network type, or the like, that data is stored in data tables maintained by the mobile subnet and related to a corresponding cellular network.

Thereafter, each cellular network interface device 552, 554, 556, 558 may connect to a cellular network and may be assigned an IP address by the cellular network and the assigned IP address is stored in a table data field that relates to the cellular network interface device ID and or bus ID. Accordingly, the subnet controller 540 generates data tables, including historical data, that are usable to store global data such as time stamps and GPS coordinates, to store subnet configuration data, to store characteristics of cellular access points local to the subnet, to store IP addresses assigned to the subnet by cellular networks, to store a subnet IP address for each locally reachable device, to store data packet header data such as destination IP address, source IP address, subnet reply port assignment and other packet header control data, to store network routes assigned to each data packet and to store network.

Referring to FIGS. 1 and 9, during normal operation each subnet controller 540 controls the flow of network traffic in the mobile subnets A, B, C, D using data tables to track activity. As described above, each subnet A, B, C, D uploads substantially all non-local network traffic to the network controller 520, which receives the uploaded traffic and routes it to destination IP addresses on the WAN 515 or on a private WAN 640. As further described above, the network controller 520 receives substantially all reply traffic responsive to the subnet uploads and downloads the reply traffic to appropriate mobile subnets A, B, C, D.

As described above, mobile subnets A, B, C, D are configured to monitor network information that is able to be monitored or is otherwise obtainable by the subnet mobile router 525 and to compile the network information obtainable by the subnet mobile router 525 in a data table or database maintained on the subnet mobile router 525. In particular, as mobile subnets A-D move over a geographic region each subnet mobile router monitors the performance of cellular networks that it communicates with by recording access point signal strength, signal noise, connection handoffs, connection drops, roaming boundaries, and other factors, and correlates the cellular network information with GPS coordinates, time stamps, network type, network traffic type and other factors, and the cellular network performance data is compiled in a data table or database maintained on each mobile subnet A-D.

In addition each subnet controller 540 is configured to monitor the performance of each network route used by the network controller 520 to download network traffic to the mobile subnet. Accordingly the mobile router 525 of each mobile subnet A-D uses whatever data is available to it to determine the data packet latency, route bandwidth and route congestion of upload routes according to which cellular network interface device 552, 554, 556, 558 the upload route is associated with, and the upload route data is compiled in the data tables or databases maintained on the mobile router 525. Similarly, the subnet controller 540 monitors the performance of the local subnets 530 and 535, by determining the average bandwidth, congestion, and other characteristics of each subnet such as data type, device type and the like, and the subnet data is compiled in the data tables or databases maintained on the mobile router.

Accordingly, each mobile router 525 maintains a limited historic record of network data compiled in various data tables and databases and periodically updates the data as conditions of the network change. In addition, subnet controllers 540 may analyze instantaneous network conditions and historic data to optimize the performance of the mobile subnet. Moreover, the subnet controllers 540 are configured to generate "subnet network updates," comprising network information obtained by and stored on the subnet controller, and to upload the subnet network updates to the network controller 520. The subnet network update generally comprises the limited historic record of data stored on the mobile subnet and clears fields of the data tables stored on the mobile subnet to free up memory space on the mobile router for storing more data. Accordingly, by uploading subnet network updates to the network controller 520, each mobile router 525 can be configured with less memory capacity than might otherwise be need to evaluate network performance. Meanwhile, a compressive historic record of the data complied by the mobile routers of each mobile subnet A-D and uploaded to the network controller 520 in subnet network updates is stored on the network controller 520 which generally includes significantly more memory capacity than the mobile routers.

Subnet network updates may include a brief or "basic update" listing the mobile subnet ID, a list of subnet public IP addresses assigned to the mobile subnet, the number of client devices being hosted by the subnet, as well as average network traffic bandwidth, average or instantaneous route latency, bandwidth peaks or bursts, and congestion data, a limited historic record of mobile subnet GPS coordinates, heading and velocity, cellular network access point ID's, signal strengths, cellular network types, drops, handoffs, roaming handoffs, queue times, link quality and any other data that may be useful and that is likely to change frequently. Preferably, basic updates contain a limited amount of data in order to avoid congesting the network routes to the network controller 520. Accordingly, a basic update preferably includes data relating to changes in network information or other differences from prior basic updates. In cases where network conditions are changing quickly, e.g. when the mobile subnet is moving, it is desirable to send frequent basic updates, every 1-5 seconds or more frequently as may be required. In cases where network conditions are slowly varying, e.g. when the mobile subnet is substantially stationary, or network traffic is minimal, the frequency of basic updates can be varied by the subnet controller 540 according to the instantaneous conditions of the subnet.

In addition to basic updates, mobile subnets may periodically upload a "comprehensive update" to the network controller 520. Comprehensive updates may be uploaded upon initial start up or at other occasions wherein a subnet changes configuration. Comprehensive updates may also be uploaded on a schedule such as one per hour, once per day or as required. Comprehensive updates may include limited historical data such as usage logs, cellular network data and other historical data that is not uploaded in basic updates. In addition, comprehensive updates may include uploading data packets usable to test or otherwise measure the instantaneous latency, bandwidth and congestion of each upload route.

Referring now to FIG. 9, upon receiving a basic or comprehensive update from a mobile subnet A-D, the network controller 520 reads the mobile subnet ID from the update and establishes or updates a data fields relating to the mobile subnet and to each upload route between the subnet and the network controller. Accordingly, the network controller 520 is configured to maintain a data table or database for each mobile subnet for storing the mobile subnet ID or the like in a top level data field and storing data relating to the top level mobile subnet ID in related data fields and for storing performance data relating to each upload route associated with the mobile subnet. Data relating to the top level mobile subnet ID may include IP addresses assigned to the cellular network interface devices 552, 554, 556, 558 installed on the mobile subnet, historic IP addresses that were previously assigned to the cellular network interface devices 552, 554, 556, 558 installed on the mobile subnet, download route performance data, mobile subnet configuration data, subnet network traffic data, cellular network characteristic data, and the like. Accordingly, the network controller 520 is configured to receive network updates from each mobile subnet A-D, to store the data contained in network updates in data tables or databases operating on the network controller 520, to continuously or periodically analyze the data contained in the data tables or databases relating to network updates.

Referring now to FIGS. 2 and 9, the network controller 520 monitors its own configuration and the performance of network routes used by the network controller 520 and stores network information in data fields or tables and or databases maintained on the network controller 520. In particular, the network controller 520 is configured to maintain a list of IP addresses assigned to each mobile subnet A-D and to associate a network route with each IP address. In addition, the network controller 520 is configured to monitor the upload performance of the network routes between each mobile subnet A-D and the network controller 520 and to store upload route performance data in data fields that relate to corresponding mobile subnets. The network controller 520 is also configured to generate "network controller updates" that include upload route performance, and to download the network controller updates to each mobile subnet A-D.

Referring now to FIG. 1 the network configuration 500 includes four IP tunnels or four network routes extending between the network controller 520 and the subnet A. In one example of operation of the mobile subnet 500, the mobile router 525 measures the characteristics of each download route, e.g. latency, bandwidth and congestion, based on download traffic received from the network controller 520 and stores characteristics of each download route on the mobile router. Thereafter, the mobile router 525 periodically compiles a subnet network update which is uploaded to the network controller 520. In response to receiving the subnet network update, the network controller 520 updates data fields stored thereon according to the subnet network update.

Similarly, the network controller 520 measures the characteristics of each upload route, e.g. latency, bandwidth and congestion based on upload traffic received from the mobile subnet A and stores characteristics of each upload route on the network controller 520. Thereafter, the network controller 520 periodically compiles a network controller update which is downloaded to the mobile router 525. In response to receiving the network controller update, the mobile router 525 updates data fields stored thereon according to the network controller update.

In one example embodiment, the network controller 520 analyzes data relating to the network controller 520, the mobile subnet A and the characteristics of each upload and download route and formulates both an upload routing scheme and a download routing scheme suitable for optimizing network performance. Thereafter, the network controller 520 downloads the uploading data scheme to the mobile router 525 which implements the uploading data scheme. Meanwhile the network controller 520 implements the downloading routing scheme.

In a second example embodiment, the network controller 520 analyzes data relating to the network controller 520 and the characteristics of each download route and formulates a download routing scheme suitable for optimizing network performance and implements the download routing scheme. Meanwhile, the network controller 520 analyzes data relating the network controller 520 and the characteristics of each upload route and formulates an upload routing scheme suitable for optimizing network performance and communicates the upload scheme to the mobile router.

Each routing scheme generally includes a set of criteria usable to select network routes. In the case where only one network route is available the routing scheme defaults to sending all download and upload network traffic over one network route. With two network routes available, various routing schemes are usable to divide network traffic over the available routes. As the number of available network routes between the mobile subnet A and the network controller 520 increases, the selection of efficient or optimum routing schemes becomes more complex. Ideally an optimum routing scheme maximizes bandwidth and minimizes overall latency and congestion on each network route. Since a network route performance is often different depending on the direction of data flow, (download or upload) the upload scheme is generally different from the download scheme.

In some situations the upload and download schemes may not optimize network performance but address other considerations such as data type, security, reliability, cost, or IP destination address. Accordingly, each of the mobile router 525 and the network controller 520 is configured to receive user inputs and factor user selectable routing criteria into the process of establishing routings schemes as required.

One example routing scheme may comprise routing all voice traffic over the network route with the lowest latency while routing all video traffic over the network route with the highest bandwidth and least congestion. Another example routing scheme may comprise routing all traffic over the lowest cost cellular network available, unless there is an urgent need or bandwidth requirement to route traffic over other cellular networks.

The network controller 520 receives subnet network updates from mobile routers and the subnet network updates include cellular network data relating to the cellular networks 505, 510 and 805. In addition, the network controller 520 may receive network updates directly from the cellular networks 505, 510 and 805 with addition cellular network data. According to a further aspect of the present invention, the network controller 520 is configured to compile and analyze the cellular network data in order to formulate routing schemes and otherwise optimize network performance. In particular, the cellular network data may include cellular network access codes or security data, cellular network access prices and use rules, geographic regions covered by the cellular network, IP addresses reachable over the cellular network, the location of cellular network access points, the signal strength of cellular network access points at various GPS coordinates, access point hand-off and drop histories, cellular network roaming boundaries, affiliated cellular networks, average and peak bandwidth, average and peak congestion, average and peak latency and other characteristics of each cellular network. In addition, the cellular network data may be correlated with time of day, week of the year, weather conditions and other factors that may affect the cellular network performance.

Accordingly, the network controller 520 may be configured to compile the cellular network data and to form a landscape representation of cellular network access points encountered by a mobile subnet and to use the landscape representation in order formulate network routing schemes and or otherwise improve network performance. In particular, the network controller 520 may be configured to use the cellular network landscape representation to predict when drops, hand-offs or roaming changes may occur for a particular mobile subnet and to adjust network traffic routing schemes accordingly. In particular, the network controller 520 may redirect download traffic over a different network route in order to avoid a drop by a cellular network. In particular, the network controller 520 may send a controller network update to a subnet instructing the subnet to redirect upload traffic over a different network route in order to avoid a drop. In another example, the network controller 520 may use historical cellular network data along with the GPS coordinates, heading and velocity of the subnet to predict which cellular network access point the subnet will be handed off to and make adjustments to network routing schemes in order to avoid a connection drop or data interruption. In particular, the subnet controller 520 may route a download to a different cellular network or access point before a hand off or a drop occurs in order to avoid a drop or interruption. Accordingly, the network controller 520 includes program steps for predicting the mobile subnet GPS coordinates where a future hand-off or drop may occur and for rerouting the download traffic accordingly. In addition, the network controller 520 keeps a historic list of subnet IP address associated with each mobile subnet and if a reply packet is associated with an inactive subnet IP address, the reply data packet can be downloaded to the appropriate subnet using an active subnet IP address as a destination address.

It will also be recognized by those skilled in the art that, while the invention has been described above in terms of preferred embodiments, it is not limited thereto. Various features and aspects of the above described invention may be used individually or jointly. Further, although the invention has been described in the context of its implementation in a particular environment, and for particular applications, e.g. a mobile network router, those skilled in the art will recognize that its usefulness is not limited thereto and that the present invention can be beneficially utilized in any number of environments and implementations including but not limited to any network environment. Accordingly, the claims set forth below should be construed in view of the full breadth and spirit of the invention as disclosed herein.

What we claim:

1. A network routing method comprising:
   operating a mobile computing device in a cellular network environment wherein the mobile computing device includes a subnet microprocessor, a subnet memory module in communication with the subnet microprocessor, a cellular network interface device in communication with the subnet microprocessor and a local area network interface device in communication with the subnet microprocessor;
   operating the cellular network interface device to become a client of a cellular network that provides network access to a WAN, wherein the cellular network interface device is assigned a cellular IP address;
   operating a network controller as a node on the WAN, wherein the network controller comprises a controller microprocessor, a controller memory and a WAN network interface device each in communication with the controller microprocessor and wherein the WAN network interface device is assigned a controller IP address;
   operating the mobile computing device to establish a local subnet in communication with locally reachable network devices, wherein at least one of the locally reachable network devices is established as a client of the local subnet and wherein, the local subnet assigns each client of the local subnet a subnet IP address;
   receiving, by the local subnet, from any client of the local subnet, a subnet data packet comprising, an IP payload and an inner IP header that precedes the IP payload, wherein the inner IP header includes a source IP address corresponding with the subnet IP address of the subnet client that the subnet data packet was received from, and a destination IP address corresponding with a destination IP address of the subnet data packet;
   reading by the mobile computing device, from the inner IP header, the destination IP address of the subnet data packet, and the source IP address corresponding with the subnet IP address of the subnet client that the subnet data packet was received from;
   determining, by the mobile computing device, if the destination IP address of the subnet data packet is a subnet IP address associated with the local subnet; and, if not;
   assigning, by the mobile computing device, to an exit data packet, a first network route for routing the exit data packet to the controller IP address over the cellular network interface device; and,
   modifying, by the mobile computing device, the subnet data packet, to form the exit data packet, wherein the exit data packet comprises, the IP payload, the inner IP header preceding the IP payload, and a tunnel IP header preceding the inner IP header, wherein the tunnel IP header includes a destination IP address corresponding with the controller IP address, and a source IP address corresponding with the cellular IP address;
   routing, by the mobile computing device, the exit data packet out of the mobile computing device, over the first network route;
   receiving, by the network controller, the exit data packet;
   modify, by the network controller, the exit data packet to form a WAN data packet wherein the WAN data packet includes the subnet data packet and a WAN IP header that precedes the subnet data packet, wherein the WAN IP header is configured to route the subnet data packet to the destination IP address of the subnet data packet and further configured to cause one or more reply data packets responsive to the subnet data packet to be routed back to the network controller; and,
   modifying, by the network controller, the one or more reply data packets to form a reply tunnel packet that includes the reply data packet and a reply tunnel IP header that precedes the reply data packet, wherein the reply tunnel IP header is configured to route the reply data packet to the mobile computing device.

2. The method of claim 1 further comprising:
   generating, by the mobile computing device, a first data table stored on the mobile computing device;
   storing, by the mobile computing device, in the first data table, data read from the inner IP header and listed in the tunnel IP header; and, associating, by the mobile computing device, the exit data packet, with the destination IP addresses of the subnet data packet, the cellular IP address and the subnet IP address of the subnet client that the subnet data packet was received from.

3. The method of claim 1 further comprising:

reading, by the network controller, from the tunnel IP header, the cellular IP address listed therein and removing the tunnel IP header from the exit data packet;

reading, by the network controller, from the inner IP header, the destination IP address of the subnet data packet and the subnet IP address of the subnet client that the subnet data packet was received from;

determining, by the network controller, if the destination IP address of the subnet data packet is a locally reachable subnet IP address associated with the network controller; and, if not;

assigning, by the network controller, to the WAN data packet, a second network route for routing the WAN data packet, to the destination IP address of the subnet data packet, over the WAN network interface device;

wherein the WAN IP header includes, a destination IP address corresponding with the destination IP address of the subnet data packet and a source IP address corresponding with the controller IP address.

4. The method of claim 3 further comprising:

receiving, by the network controller, from the destination IP address of the subnet data packet, the one or more reply data packets responsive to the WAN data packet;

wherein each reply data packet comprises, a reply IP payload and a reply IP header preceding the reply IP payload, wherein the reply IP header includes a destination IP address corresponding with the network controller IP address, and a source IP address corresponding with the destination IP address of the subnet data packet;

reading, by the network controller, from the reply IP header, the destination IP address of the subnet data packet, and removing the reply IP header from the reply data packet;

determining, by the network controller, from data stored by the network controller, the WAN data packet corresponding with the reply data packet, a cellular IP address presently corresponding with the cellular network interface device and the subnet IP address of the subnet client that the subnet data packet was received from; and assigning, by the network controller, to a reply tunnel packet, a third network route for routing, the reply tunnel packet, to the cellular IP address presently corresponding with the cellular network interface device, over the WAN network interface device;

modifying, by the network controller, the reply data packet to form the reply tunnel packet, wherein the reply tunnel packet comprises, the reply IP payload, a reply inner IP header that precedes the reply IP payload and a reply IP tunnel header that precedes the reply inner IP header, wherein the reply inner IP header includes a destination IP address corresponding with the subnet IP address of the subnet client that the subnet data packet was received from and a source IP address corresponding with the destination IP address of the subnet data packet, wherein the reply tunnel IP header includes a destination IP address corresponding with the cellular IP address presently corresponding with the cellular network interface device and a source IP address corresponding with the network controller IP address; and, routing, by the network controller, the reply tunnel packet, out of the network controller, over the third network route.

5. The method of claim 2 further comprising:

generating, by the network controller, a second data table, stored on the network controller;

storing, by the network controller, in the second data table, data read from each of the tunnel IP header, the inner IP header and listed in the WAN IP header; and, associating, by the network controller, the WAN data packet, with the destination IP address of the subnet data packet, the cellular IP address, and the subnet IP address of the subnet client that the subnet data packet was received from.

6. The method of claim 4 further comprising:

receiving, by the mobile computing device, from the network controller, over the cellular network interface device, the reply tunnel packet;

reading, by the mobile computing device, the cellular IP address from the reply tunnel IP header and removing the reply tunnel IP header from the reply tunnel packet;

reading, by the mobile computing device, from the reply inner IP header, the destination IP address corresponding with the subnet IP address that the subnet data packet was received from and the source IP address corresponding with the subnet client that the subnet data packet was received from; and, routing, by the mobile computer device, the reply IP packet to the source IP address that the subnet data packet was received from.

7. The method of claim 6 further comprising:

generating, by the mobile computing device, a first data table stored on the mobile computing device;

generating, by the network controller, a second data table stored on the network controller;

storing, by the mobile computing device, in the first data table, data read from the inner IP header and listed in the tunnel IP header of the exit data packet;

associating, by the mobile computing device, the exit data packet, with the destination IP addresses of the subnet data packet, the cellular IP address and the subnet IP address of the subnet client that the subnet data packet was received from;

storing, by the network controller, in the second data table, data read from the inner IP header and listed in the tunnel IP header of the exit data packet and data read from the reply inner header and the reply tunnel header;

associating, by the network controller, the exit data packet with the destination IP address of the subnet data packet, the cellular IP address, presently corresponding with the cellular network interface device, and the subnet IP address of the subnet client that the subnet data packet was received from;

storing, by the mobile computing device, in the first data table, data read from the reply tunnel IP header and from the reply inner IP header that at least includes, the subnet IP address that the subnet data packet was received from, the destination IP address of the subnet data packet, and the cellular IP address presently corresponding with the cellular network interface device; and, associating, by the mobile computing device, the reply tunnel packet with the destination IP address of the subnet data packet, the cellular IP address, presently corresponding with the cellular network interface device, and the subnet IP address of the subnet client that the subnet data packet was received from.

8. The method of claim 7 wherein the subnet data packet further lists in the inner IP header thereof, first control data associated with routing the subnet data packet wherein the first control data is included by the subnet client that the subnet data packet was received from, further comprising:
reading, by the mobile computing device, from the subnet data packet inner IP header, the first control data;
storing, by the mobile computing device, in the first data table, at least a portion of the first control data; and,
associating, by the mobile computing device, the stored first control data with, the destination IP addresses of the subnet data packet and with the subnet IP address of the subnet client that the subnet data packet was received from.

9. The method of claim 8 wherein the first control data comprises a subnet packet ID, further comprising:
storing, by the mobile computing device, in the first data table, the subnet packet ID; and,
associating, by the mobile computing device, the subnet packet ID with the destination IP addresses of the subnet data packet, the subnet IP address of the subnet client that the subnet data packet was received from and the cellular IP address.

10. The method of claim 9 further comprising:
generating, by the mobile computing device, after assigning the first network route to the exit data packet, second control data associated with routing the exit data packet over the first network route, wherein the second control data is different from the first control data;
writing, by the mobile computing device, to the tunnel IP header, the second control data;
writing, by the mobile computing device, to the first data table, at least a portion of the second control data and,
associating, by the mobile computing device, the stored second control data with the destination IP addresses of the subnet data packet, the subnet IP address of the subnet client that the subnet data packet was received from and the cellular IP address.

11. The method of claim 10 further comprising:
reading, by the network controller, from the tunnel IP header, the second control data;
storing, by the network controller, to the second data table, at least a portion of the second control data;
associating, by the network controller, the stored second control data with the destination IP addresses of the subnet data packet, the subnet IP address of the subnet client that the subnet data packet was received from and the cellular IP address.

12. The method of claim 10 wherein the mobile computing device has a subnet ID, further comprising:
including, by the mobile computing device, the subnet ID in the second control data listed in the tunnel IP header and stored in the first data table;
reading, by the network controller, from the tunnel IP header, the subnet ID;
storing, by the network controller, in the second data table, the subnet ID; and,
associating, by the network controller and by the mobile computing device the subnet ID with the cellular IP address.

13. The method of claim 10 further comprising:
generating, by the network controller, after assigning the second network route to the WAN data packet, third control data associated with routing the WAN data packet over the second network route, wherein the third control data is different from the first and the second control data;
writing, by the network controller, to the WAN IP header, the third control data;
writing, by the network controller, to the second data table, at least a portion of the third control data and,
associating, by the network controller, the stored third control data with the destination IP addresses of the subnet data packet, the subnet IP address of the subnet client that the subnet data packet was received from and the cellular IP address.

14. The method of claim 2 wherein the mobile computing device has a subnet ID, further comprising:
writing, by the mobile computing device, to the tunnel IP header, the subnet ID,
storing, by the mobile computing device, in the first data table, the subnet ID; and,
associating, by the mobile computing device, the subnet ID with the subnet data packet, with the exit data packet corresponding with the subnet data packet and with the cellular IP address.

15. The method of claim 3 wherein mobile computing device has a subnet ID, further comprising:
writing, by the mobile computing device, to the tunnel IP header, the subnet ID;
storing, by the mobile computing device, the subnet ID;
associating, by the mobile computing device, the subnet ID with the subnet data packet, with the exit data packet corresponding with the subnet data packet and with the cellular IP address;
reading, by the network controller, from the tunnel IP header, the subnet ID;
storing, by the network controller, the subnet ID; and,
associating, by the network controller, the subnet ID with the exit data packet, with the WAN data packet corresponding with the exit data packet, with the reply tunnel packet and with the cellular IP address.

16. The method of claim 14 wherein the mobile computing device has a subnet ID further comprising:
generating by the mobile computer device, from data stored in the first data table, a subnet network update at least listing, the subnet ID, the cellular IP address presently associated with the cellular network interface device, and each cellular IP address that has historically been associated with the cellular network interface device; and,
uploading, by the mobile computing device, to the network controller, the subnet network update.

17. The method of claim 16 further comprising:
receiving, by the network controller, from the mobile computing device, the subnet network update;
storing, by the network controller, at least a portion of the data listed in the subnet network update; and,
associating, by the network controller, the cellular IP address presently associated with the cellular network interface device and each cellular IP address that was historically associated with the cellular network interface device with the subnet ID.

18. A network routing method comprising the steps of:
operating, a mobile computing device, in a cellular network environment, wherein the mobile computing device comprises, a subnet microprocessor, a subnet memory module in communication with the subnet microprocessor, one or more local area network interface devices in communication with the subnet microprocessor and a plurality of cellular network interface devices in communication with the subnet microprocessor;

operating, a network controller comprising, a controller microprocessor, a controller memory module, in communication with the controller microprocessor, and a Wide Area Network interface device in communication with the controller microprocessor, wherein the network controller is established as a client of a Wide Area Network (WAN) and is assigned, a controller IP address;

establishing, by the one or more local area network interface devices, one or more local subnets operating on the mobile computing device, wherein each local subnet comprises at least one locally reachable network device operating as a client thereof and wherein each client thereof is assigned, a subnet IP address corresponding with one of the one or more local subnets;

operating at least two of the plurality of cellular network interface devices as a client of a cellular network that provides network access to the WAN, wherein each client of the cellular network is assigned, a cellular IP address corresponding with the cellular network;

receiving, by the mobile computing device, from one or more clients of the one or more local subnets, a plurality of subnet data packets, wherein each subnet data packet comprises, an IP payload and an IP inner header that precedes the IP payload, wherein the IP inner header lists therein, a destination IP address of the IP payload, a source IP address corresponding with a subnet IP address of the subnet client device that the subnet data packet was received from, and first control data;

reading, by the mobile computing device, from the inner IP header of each of the plurality of subnet data packets, the destination IP address of the IP payload, the source IP address corresponding with the subnet IP address of the subnet client device that the subnet data packet was received from, and the first control data;

determining, by the mobile computing device, for each of the plurality of subnet data packets received thereby, if the destination IP address of the IP payload is a locally reachable subnet IP address corresponding with one of the one or more local subnets; and, if not:

selecting, by the mobile computing device, one of the at least two clients of the cellular network as a first network route for routing each subnet data packet not having a locally reachable destination IP address out of the mobile computing device;

modifying, by the mobile computing device, each subnet data packet, not having a locally reachable destination IP address, to form a corresponding exit data packet configured to be routed to the network controller over the selected client of the cellular network; and, routing, by the mobile computing device, the exit data packet to the network controller over the selected client of the cellular network.

19. The network routing method of claim 18 wherein each exit data packet comprises, the subnet data packet corresponding therewith encapsulated by a tunnel IP header that precedes the inner IP header, wherein the tunnel IP header lists therein, a destination IP address corresponding with the network controller IP address and a source IP address corresponding with the cellular IP address of the selected client of the cellular network.

20. The method of claim 19 wherein the tunnel IP header further lists second control data therein, wherein the second control data is different from the first control data.

21. The method of claim 20 wherein each of the first control data and the second control data comprises any one of: a packet IP version, a header length, a packet length, a packet type, a packet quality of service, a packet ID tag, packet fragmentation and offset data, a packet protocol, a check sum for error detection, a time to live and a reply port assignment.

22. The method of claim 18 wherein the inner IP header and the tunnel IP header are each configured for a different packet protocol.

23. The method of claim 19 further comprising the steps of:

generating, by the mobile computing device, a first data table, stored by the mobile computing device;

storing, by the mobile computing device, in the first data table, at least a portion of the data read from the inner IP header and at least a portion of the data written to the tunnel IP header; and, associating, by the mobile computing device, in the first data table, each subnet data packet and the exit date packet corresponding therewith, with, the destination IP address of the of the IP payload, the subnet IP address of the subnet client device that the subnet data packet was received from, and the cellular IP address of the selected client of the cellular network.

24. The method of claim 18 wherein each of the at least two of the plurality of cellular network interface devices operating as a client of the cellular network provides a different upload route between the mobile computing device and the network controller, further comprising the steps of:

operating each of the mobile computing device and the network controller to acquire, for each different upload route the network operating characteristics thereof;

exchanging, between the mobile computing device and the network controller, the network operating characteristic of each different upload route; and, storing, on each of the mobile computing device and the network controller, the network operating characteristic of each different upload route.

25. The method of claim 24 further comprising the step of; operating, by the mobile computing device, an upload routing scheme configured to select, for each exit data packet, the client of the cellular network corresponding with an upload route that has a favorable network operating characteristic.

26. The method of claim 25 wherein operating the upload routing scheme further comprising the steps of:

storing, on the mobile computing device, upload route selection criteria;

comparing, by the mobile computing device, the upload route selection criteria with the network operating characteristic of each different upload route; and, selecting, by the mobile computing device, the client of the cellular network corresponding with the upload route that is most favorably matched to upload route selection criteria.

27. The method of claim 18:

wherein the cellular network that provides network access to the WAN includes a plurality of cellular networks, each of a different cellular network type;

wherein the plurality of cellular network interface devices in communication with the subnet microprocessor includes at least one cellular network interface device operable to be established as a client of each different cellular network type;

wherein the step of, selecting, by the mobile computing device, one of the at least two clients of the cellular network as a first network route includes selecting different cellular network interface device types operating as a client of different cellular network types.

28. The network routing method of claim 27:

wherein each exit data packet comprises, the subnet data packet corresponding therewith encapsulated by a tunnel IP header preceding the inner IP header;

wherein the tunnel IP header lists therein, a destination IP address corresponding with the network controller IP address, a source IP address corresponding with the cellular IP address of the selected client of the cellular network, and second control data;

wherein the tunnel IP header is configured to be compatible with being routed to the network controller over the selected cellular network interface device type and corresponding cellular network type.

29. The method of claim 18 further comprising the steps of:

receiving, by the mobile computing device, from the network controller, over at least two of the plurality of cellular network interface devices operating as a client of the cellular network, a plurality of reply tunnel packets each being responsive to a subnet data packet corresponding therewith;

wherein each reply tunnel packet includes a reply inner IP header preceding a reply IP payload, wherein the reply inner IP header lists therein, the subnet IP address of the subnet client device that the subnet data packet was received from, and the corresponding destination IP address of the subnet data packet;

reading, by the mobile computing device, from the reply inner IP header, the subnet IP address of the subnet client device that the subnet data packet was received from and the destination IP address of the subnet data packet; and, routing, by the mobile computer device, the reply IP payload to the subnet IP address that the subnet data packet was received from.

30. The method of claim 18 further comprising the step of: receiving, by the network controller, from the mobile computing device, a plurality of exit data packets, wherein a portion of the plurality of exit data packets is received over a plurality of first network routes each corresponding with a different one of the least two clients of the cellular network.

31. The method of claim 21, further composing the steps of:

receiving, by the network controller, from the mobile computing device, a plurality of exit data packets, wherein a portion of the plurality of exit data packets is received over a plurality of first network routes with each first network route corresponding with a different one of the least two clients of the cellular network;

reading, by the network controller, from the tunnel IP header of each exit data packet, the cellular IP address listed therein, and removing the tunnel IP header therefrom;

reading, by the network controller, from the inner IP header of each exit data packet, the destination IP address of the subnet data packet, and the subnet IP address of the subnet client that the subnet data packet was received from;

determining, by the network controller, if the destination IP address of the subnet data packet is a locally reachable IP address associated with the network controller; and, if not;

assigning, by the network controller, to a WAN data packet corresponding with the exit data packet, a second network route for routing the WAN data packet from the network controller, to the destination IP address of the subnet data packet over the WAN network interface device;

modifying, by the network controller, the exit data packet to form the WAN data packet corresponding therewith, wherein the WAN data packet is modified to correspond with routing the WAN data packet over the assigned second network route; and, routing, by the network controller, the WAN data packet to the destination IP address of the subnet data packet over the assigned second network route.

32. The network routing method of claim 31 wherein the WAN data packet comprises, the subnet data packet encapsulated by a WAN IP header preceding the inner IP header, wherein the WAN IP header lists therein a destination IP address corresponding with the destination IP address of the subnet data packet, and a source IP address corresponding with the network controller IP address.

33. The method of claim 32 further comprising the steps of:

generating, by the network controller, a second data table, stored by the network controller;

storing, by the network controller, in the second data table, at least a portion of the data read from the inner IP header and at least a portion of the data written to the WAN IP header; and, associating, by the network controller, in the second data table, each WAN data packet and the exit data packet corresponding therewith, with, the destination IP address of the of the IP payload, the subnet IP address of the subnet client device that the subnet data packet was received from and the cellular IP address corresponding with the exit data packet.

34. The method of claim 33 wherein the WAN IP header further lists third control data therein and wherein the third control data is different from the second control data.

35. The method of claim 33 wherein the third control data comprises any one of: a packet IP version, a header length, a packet length, a packet type, a packet quality of service, a packet ID tag, packet fragmentation and offset data, a packet protocol, a check sum for error detection, a time to live and a reply port assignment.

36. The method of claim 31 further comprising the steps of:

receiving, by the network controller, from the destination IP address of the subnet data packet, a reply data packet responsive to the WAN data packet, wherein the reply data packet comprises, a reply IP payload and a reply IP header preceding the reply IP payload, wherein the reply IP header includes, a destination IP address corresponding with the network controller IP address and a source IP address corresponding with the destination IP address of the subnet data packet;

reading, by the network controller, from the reply IP header, the destination IP address of the subnet data packet, and removing the reply IP header from the reply data packet;

determining, by the network controller, from the data stored on the second data table, the exit data packet corresponding with the reply data packet, the cellular IP address corresponding with the exit data packet and any other cellular IP addresses corresponding with the at least two clients of the cellular network;

selecting, by the network controller, one of the at least two clients of the cellular network as a third network route for routing a reply tunnel data packet to the mobile computing device over;

modifying, by the mobile computing device, each reply data packet to form a corresponding reply tunnel data packet configured to be routed to the mobile computing device over the selected client of the cellular network; and, routing, by network, the reply tunnel data packet to the mobile computing device over the selected client of the cellular network.

37. A network routing method comprising:

deploying, a network controller, on a network reachable from a WAN, wherein the network controller comprises a controller microprocessor and an associated controller memory module and one or more WAN network interface devices in communication with the controller microprocessor, wherein the one or more WAN network interface devices is each assigned a controller IP address and wherein the network controller is not operated as an autonomous system router of the WAN;

deploying, a mobile computing device, in a cellular network environment, wherein the mobile computing device comprises, a subnet microprocessor, and an associated subnet memory module, one or more local area network interface devices, each in communication with the subnet microprocessor, and a cellular network interface device in communication with the subnet microprocessor, wherein clients of the local area network are each assigned, a subnet IP address, and wherein the cellular network interface device is established as a client of a cellular network that provides a gateway to the WAN and is assigned, a cellular IP address by the cellular network;

receiving, by the mobile computing device, from clients of the local area network, a plurality of subnet data packets that have a destination IP address that is not a subnet IP address;

assigning, by the mobile computing device, to each subnet data packet that has a destination IP address that is not a subnet IP address, a first network route that exits the mobile computing device over the cellular network interface device, passes over the cellular network to the WAN gateway and passes over the WAN to the controller IP address;

modifying, by the mobile computing device, each subnet data packet that has a destination IP address that is not a subnet IP address, to form a corresponding exit data packet, wherein the corresponding exit data packet comprises the subnet data packet encapsulated by a tunnel IP header wherein the tunnel IP header is configured to route the exit data packet over the first network route;

receiving, by the network controller, the plurality of exit data packets over the one or more WAN interface devices;

removing, by the network controller, the tunnel IP header from each exit data packet to reveal the corresponding subnet data packet;

forming, by the network controller, a WAN data packet corresponding with the subnet data packet by encapsulating the subnet data packet with a WAN IP header wherein the WAN IP header is configured to route the WAN data packet to the destination IP address of the subnet data packet and to generate a reply data packet responsive to the WAN data packet that is routed back to the network controller over the one or more WAN interface devices.

* * * * *